United States Patent Office 3,328,444
Patented June 27, 1967

3,328,444
HEXAFLUORO ARSENIC AND PHOSPHORIC ACID ADDUCTS OF UREA COMPOUNDS
Hugh T. Harrison, Tulsa, Okla., assignor to The Dow Chemical Company, Midland, Mich., a corporation of Delaware
No Drawing. Filed Jan. 27, 1964, Ser. No. 340,492
5 Claims. (Cl. 260—440)

The present application is directed to novel urea compounds and is directed, in particular, to the novel urea compounds of the formula

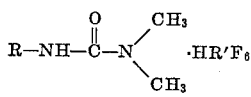

In the above and succeeding formulae, R represents a member selected from the group consisting of parachlorophenyl and 3,4-dichlorophenyl, and R' represents a member selected from the group consisting of arsenic and phosphorus.

The present compounds are solid materials, of low solubility in water and of low to moderate solubility in organic solvents. They are useful as parasiticides, and are adapted to be employed for the control of insect, arachnid, bacterial, and fungal pests, such as, for example, *Tetranychus bimaculatus*, confused flour beetle, California red scale, brown rot, bean rust, lone star tick, *Staphylococcus aureus*, *Pullularia pullulans*, and *Rhizopus nigricans*. The compounds are also useful as anthelmintics for the control of various helminth organisms.

The novel compounds can be prepared by reacting hexafluoroarsenic acid or hexafluorophosphoric acid and a urea compound of the following formula

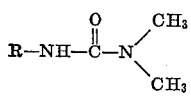

Conveniently, the reaction is carried out in an inert liquid reaction medium, such as water or a loweralkanol. Good results are obtained when substantially equimolecular proportions of the reactants are employed, or when the hexafluoroarsenic acid or hexafluorophosphoric acid is supplied in an amount in excess of that which is equimolecular with the amount of urea compound employed. The reaction is exothermic and takes place smoothly at temperatures of from 20° to 100° C.

In carrying out the reaction, the hexafluoroarsenic acid or hexafluorophosphoric acid is contacted with the urea compound in any conventional manner. Conveniently, the contacting is carried out by adding one reactant to the other. Oftentimes, it is convenient to employ the hydrate form of the acid. The temperature of the resulting reaction medium can be controlled by regulating the rate of the contacting of the reactants as well as by external heat exchange. Sometimes the desired product precipitates in the mixture during the reaction. If desirable to maintain fluid condition, such product can be separated in part from fluid portions of the mixture by conventional procedures. Upon completion of the contacting of the reactants, most of the reaction will have taken place with the production of the desired product. Where optimum yields are desired, it is often convenient that the reaction mixture be allowed to stand several hours or longer under reaction conditions to insure substantial completion of reaction.

Upon completion of the reaction, the solvent can be removed from the reaction mixture by evaporation or distillation under reduced pressure to obtain the product as a residue. Such product residue can be further purified by conventional procedures such as, for example, washing with water or suitable organic liquid, or recrystallization.

EXAMPLE 1.—3-(3,4-DICHLOROPHENYL)-1,1-DIMETHYLUREA HEXAFLUOROARSENATE 3-(3,4-dichlorophenyl)-1,1-dimethylurea of 80 percent purity (23 grams; equivalent to 0.08 mole of 3-(3,4-dichlorophenyl)-1,1-dimethylurea) was mixed with 350 milliliters of ethanol and the mixture heated in a steam bath for a period of about 10 minutes to disperse the 3-(3,4-dichlorophenyl)-1,1-dimethylurea compound in the ethanol. The resulting dispersion was thereafter filtered to separate therefrom about 4.5 grams of undissolved solids of an identity not ascertained but assumed to be the 20 percent impurity contained in the starting 3-(3,4-dichlorophenyl)-1,1-dimethylurea material. The filtrate was added in one portion to 150 grams of an aqueous 65 percent solution of hexafluoroarsenic acid (equivalent to about 0.5 mole of $HAsF_6$). The aqueous $HAsF_6$ solution employed herein is a commercial product containing 65 percent $HAsF_6$, 21 percent $H_2O$ and 14 percent related arsenic acids. After the addition of the filtrate to the hexafluoroarsenic acid solution, the resulting reaction mixture was heated to a temperature of 100° C., with continuous stirring, and maintained at a temperature of 100° C. with continuous stirring, for a period of one and one-half hours. Thereafter, the reaction mixture was cooled to a temperature of about 0° C.; during the cooling period, the 3-(3,4-dichlorophenyl)-1,1-dimethylurea hexafluoroarsenate product precipitated in the reaction mixture. The reaction mixture was filtered to separate the product precipitate as a residue, and the product residue was dried by evaporation under subatmospheric pressure.

The filtrate was subjected to subatmospheric pressure to remove therefrom a portion of the ethanol and to obtain a concentrated filtrate solution containing additional precipitated 3-(3,4-dichlorophenyl)-1,1-dimethylurea hexafluoroarsenate product. The additional product precipitate was separated from the concentrated filtrate solution by filtration, and the separated additional product added to the original product residue.

The product is a solid material melting at 111–114° C.

In a similar manner, 3-(3,4-dichlorophenyl)-1,1-dimethylurea hexafluorophosphate (melting at 95–100° C.) was prepared by reacting together 3-(3,4-dichlorophenyl)-1,1-dimethylurea and hexafluorophosphoric acid.

EXAMPLE 2.—3-(PARA-CHLOROPHENYL)-1,1-DIMETHYLUREA HEXAFLUOROPHOSPHATE

A 20-gram quantity of 3-(para-chlorophenyl)-1,1-dimethylurea of 95.3 percent purity (0.09 mole of 3-(para-chlorophenyl)-1,1-dimethylurea) is mixed with 200 milliliters of ethanol and the resulting mixture warmed for a period of time. The warmed mixture is added in one portion to 100 grams of an aqueous 65 percent solution of hexafluorophosphoric acid (equivalent to about 0.4 mole). The aqueous $HPF_6$ solution employed herein is a commercial product containing 65 percent $HPF_6$, 21 percent $H_2O$, and 14 percent related phosphorus acid. The reaction mixture is thereafter heated for a period of about 1 hour to a temperature of 100° C., with continuous stirring throughout the heating period. At the end of the heating period, the reaction mixture is permitted to cool for several hours and the cooled mixture filtered to separate the 3-(para-chlorophenyl)-1,1-dimethylurea hexafluorophosphate product as a residue.

The product residue is purified by drying under subatmospheric pressure. The product melts at 114–117° C.

In a similar manner, 3-(para-chlorophenyl)-1,1-dimethylurea hexafluoroarsenate (melting at 137–139° C.)

is prepared by reacting together 3-(para-chlorophenyl)-1,1-dimethylurea and hexafluoroarsenic acid.

When the present compounds are employed as parasiticides, the unmodified compounds can be used. However, the present invention also encompasses the use of a compound together with a parasiticide adjuvant. In such use, the compound can be dispersed upon a finely divided solid and the resulting preparation employed as a dust. Also, such mixture can be dispersed in water with the aid of a wetting agent and the resulting aqueous suspension employed as a spray. In other procedures, the products can be employed as constituents of organic liquid compositions, oil-in-water, or water-in-oil emulsions, or water dispersions with or without the addition of wetting, dispersing, or emulsifying agents.

In representative operations, each of 3-(3,4-dichlorophenyl)-1,1-dimethylurea hexafluorophosphate and 3-(para-chlorophenyl) - 1,1 - dimethylurea hexafluorophosphate was employed for the control of two-spotted spider mite. In these operations, each of the compounds was dispersed, in separate operations, in a quantity of water to prepare an aqueous dispersion containing 500 parts of one of the test compounds, as sole active toxicant, per million parts by weight of ultimate dispersion. A stand of young cranberry bean plants heavily infested with two-spotted spider mites was thoroughly wetted briefly with one of the dispersions, and another stand of young cranberry bean plants similarly infested was thoroughly wetted briefly with the other dispersion. Thereafter, all of the wetted plants were permitted to dry, and the dried plants held for a period of several days under conditions conducive to the continued growth of two-spotted spider mite populations. A control stand of young cranberry bean plants heavily infested with two-spotted spider mites was held for the same period of time under the same conditions. At the end of the period, all of the plants were examined and it was found that in each stand of plants treated with one of the test compounds, there was obtained a 100 percent kill and control of two-spotted spider mites, while on the control stand of plants, there was a heavy infestation of two-spotted spider mites.

I claim:

1. Compound of the formula

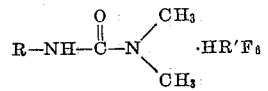

wherein R represents a member selected from the group consisting of para-chlorophenyl and 3,4-dichlorophenyl and R' represents a member selected from the group consisting of arsenic and phosphorus.

2. 3 - (3,4 - dichlorophenyl) - 1,1 - dimethylurea hexafluoroarsenate.

3. 3 - (3,4 - dichlorophenyl) - 1,1 - dimethylurea hexafluorophosphate.

4. 3 - (para-chlorophenyl) - 1,1 - dimethylurea hexafluoroarsenate.

5. 3 - (para-chlorophenyl) - 1,1 - dimethylurea hexafluorophosphate.

No references cited.

TOBIAS E. LEVOW, *Primary Examiner.*

W. F. W. BELLAMY, *Assistant Examiner.*